United States Patent [19]

Schultz

[11] Patent Number: 5,129,924
[45] Date of Patent: Jul. 14, 1992

[54] SUPPLEMENTAL OXYGEN VENTILATOR

[76] Inventor: Jerald Schultz, 354 Longacre Ave., Woodmere, N.Y. 11598

[21] Appl. No.: 459,184

[22] Filed: Dec. 29, 1989

[51] Int. Cl.$^5$ .............................................. B01D 53/22
[52] U.S. Cl. ................................................ 55/158; 55/16
[58] Field of Search .................. 55/158, 316, 16; 98/1

[56] References Cited

U.S. PATENT DOCUMENTS

| | | | |
|---|---|---|---|
| 1,685,759 | 9/1928 | Walter | 55/158 X |
| 2,597,907 | 5/1952 | Steiner et al. | 55/158 |
| 2,958,391 | 11/1960 | De Rosset | 55/158 X |
| 2,966,235 | 12/1960 | Kammermeyer | 55/16 |
| 3,486,301 | 12/1969 | Bonnet | 55/158 |
| 3,499,265 | 3/1970 | Langley et al. | 55/158 |
| 3,817,232 | 6/1974 | Nakajima et al. | 55/158 X |
| 4,174,955 | 11/1979 | Blackmer et al. | 55/158 |
| 4,406,673 | 9/1983 | Yamada et al. | 55/158 X |
| 4,537,606 | 8/1985 | Itoh et al. | 55/158 |
| 4,553,988 | 11/1985 | Shimizu et al. | 55/158 |
| 4,704,139 | 11/1987 | Yamamoto et al. | 55/158 |
| 4,789,388 | 12/1988 | Nishibara et al. | 55/158 |
| 4,950,315 | 8/1990 | Gollan | 55/158 |

*Primary Examiner*—Harold Joyce

[57] ABSTRACT

A method and apparatus for supplying oxygen enriched air to interior space from the atmosphere, consisting of an air pump that is arranged to blow air thru an oxygen concentrator that discharges oxygen enriched air to an interior duct, while it returns excess nitrogen to the atmosphere.

2 Claims, 6 Drawing Sheets

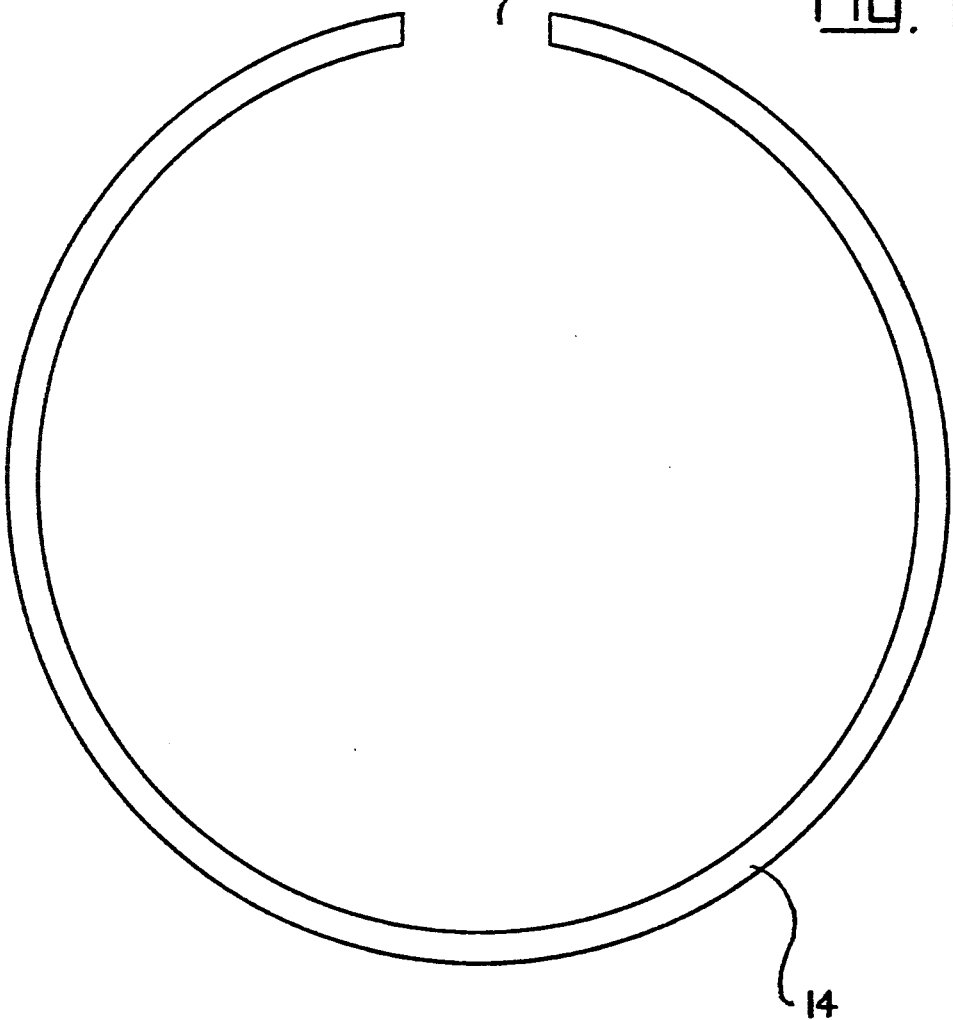

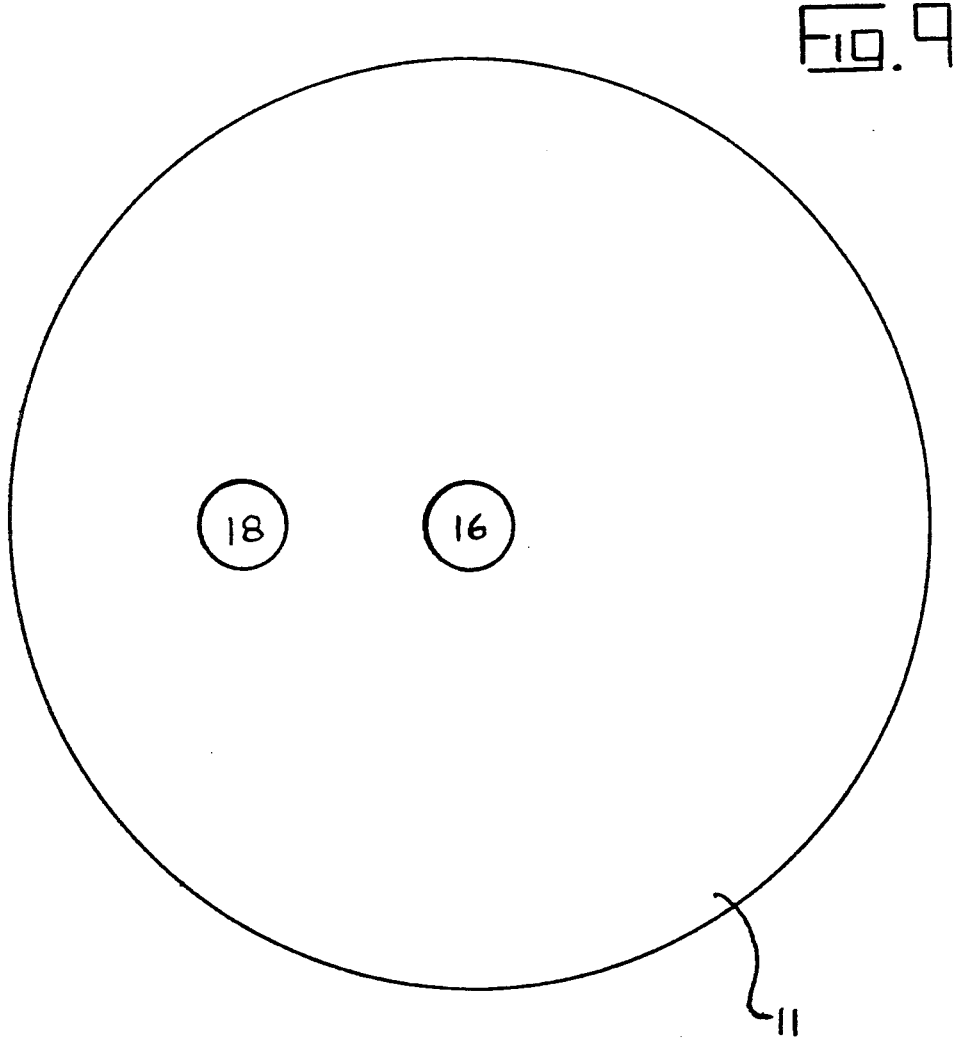

SUPPLEMENTAL OXYGEN VENTILATOR

SUMMARY OF THE INVENTION

The invention is a Supplemental Oxygen Ventilator for interior space which is comprised of an oxygen concentrator in combination with an air pump, arranged with the oxygen concentrator extracting oxygen enriched air from the atmosphere while discarding excess nitrogen back into the atmosphere and the air pump moving the oxygen enriched air into the interior space. The device can be mounted in a window or adjacent to wall or roof openings into a buildings interior. An intake duct and a orifice for the discharge of excess nitrogen will be located in exterior positions while a duct located to discharge air inward will carry oxygen enriched air into the interior space of a building.

The main object of the invention is to provide a device which can supply oxygen enriched air from the atmosphere to interior space.

A further object of the invention is to provide a Supplemental Oxygen Ventilator which utilizes an inexpensive oxygen concentrator in combination with a simple air pump.

DESCRIPTION OF THE DRAWINGS

FIG. 7 Is a circular plan view of the spacer gasket 14 showing a vent 24.

FIG. 8 is a side view projection of the spacer 14 showing a vent 24.

FIG. 9 is a circular plan view of the disk 11 showing holes 16 and 18.

FIG. 10 is a side view of the disk 11 showing holes 16 and 18.

In FIG. 1 the electric motor driven air pump 1 takes in air from the atmosphere and forces it under pressure into the oxygen concentrator 4 which consists of a long length of convoluted thin wall tubing constructed of a material such as unglazed porcelain, which has the property of being substantially more permeable to nitrogen molecules than to oxygen molecules. This property of differential permeability increases as the air pressure inside the tubing increases, which is the reason the adjustable orifice valve 5 is provided. The valve is located just before the discharge port 6 and creates back pressure in the concentrator 4. The pressure increases as the size of the orifice of the valve is reduced.

There are many other materials some of which are commonly used as filters that can do the same thing that the unglazed porcelain does, that is allow much more nitrogen to pass thru than oxygen. The discharge port 6 can be connected to any air duct leading to an interior space that is to be ventilated with supplemental oxygen.

In addition to its other novel features, this invention is novel because it is only providing a minor increase in the proportion of oxygen in air. All other oxygen concentrating or refining apparatus attempt to approach the pure or one hundred percent state for bottling or the like, and are much more complex.

Figure 1:
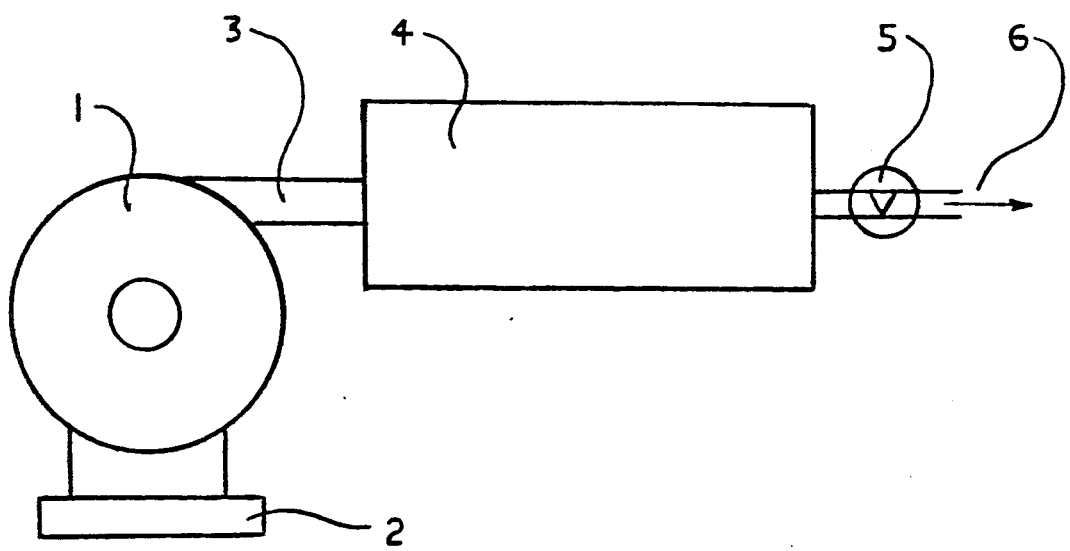
FIG. 1 is a side elevation view of a Supplemental Oxygen Ventilator showing an electric motor driven air pump 1 mounted on a base 2 having a discharge duct 3 integrally connected to an oxygen concentrator 4 which has an adjustable orifice valve 5 controlled discharge port 6.
Figure 2:
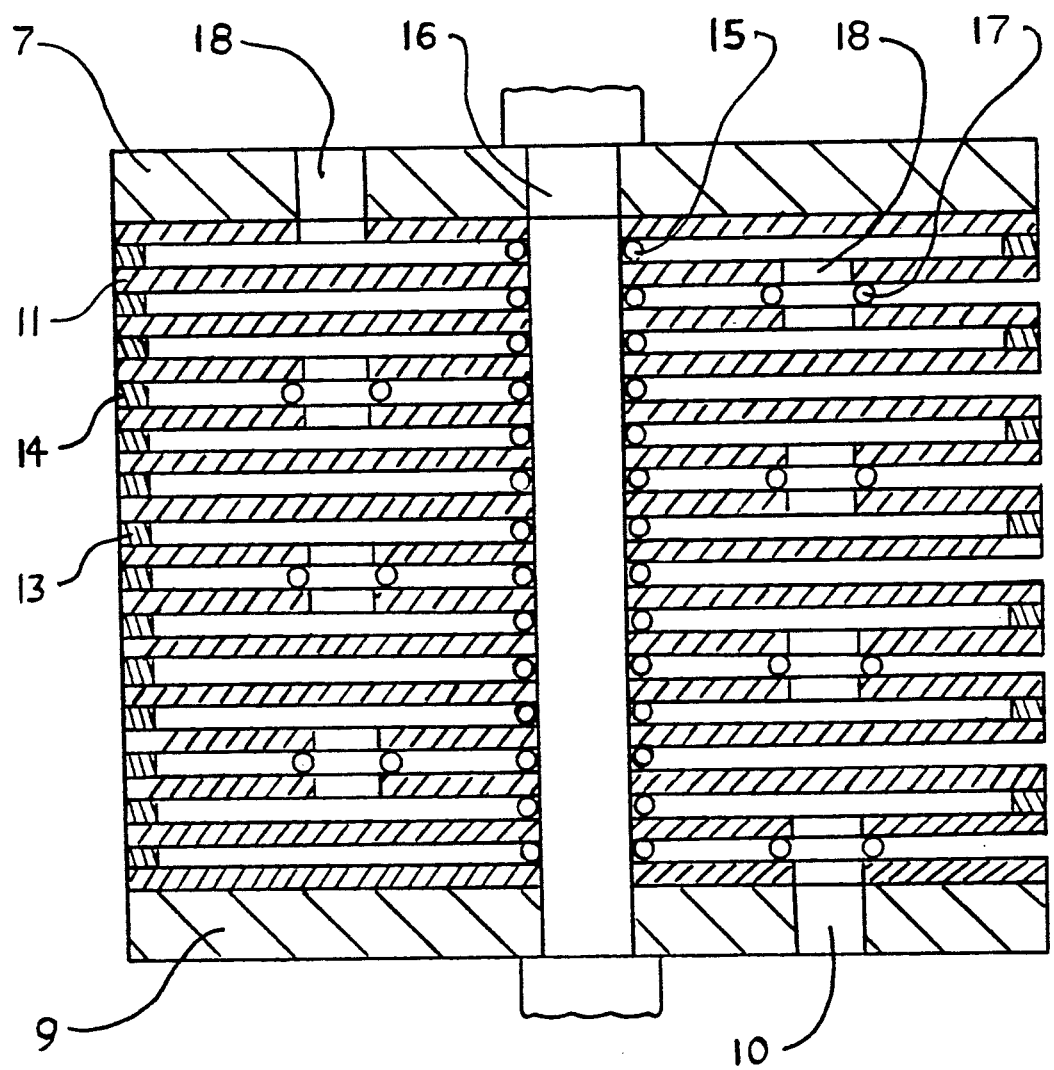
FIG. 2 is a crossectional view of a cylindrical oxygen concentrator showing a top cap 7 having a port 8 and a bottom cap 9 having a port 10. Between the caps are multiple discs 11 which are micro-porous, that are stacked vertically around a central bolt 12 and separated alternately by a full gasket 13, a spacer gasket 14, and with central O rings 15 on the central holes 16 and side O rings 17 on the side holes 18 of the discs 11. All caps and discs have central bolt holes.
Figure 3:
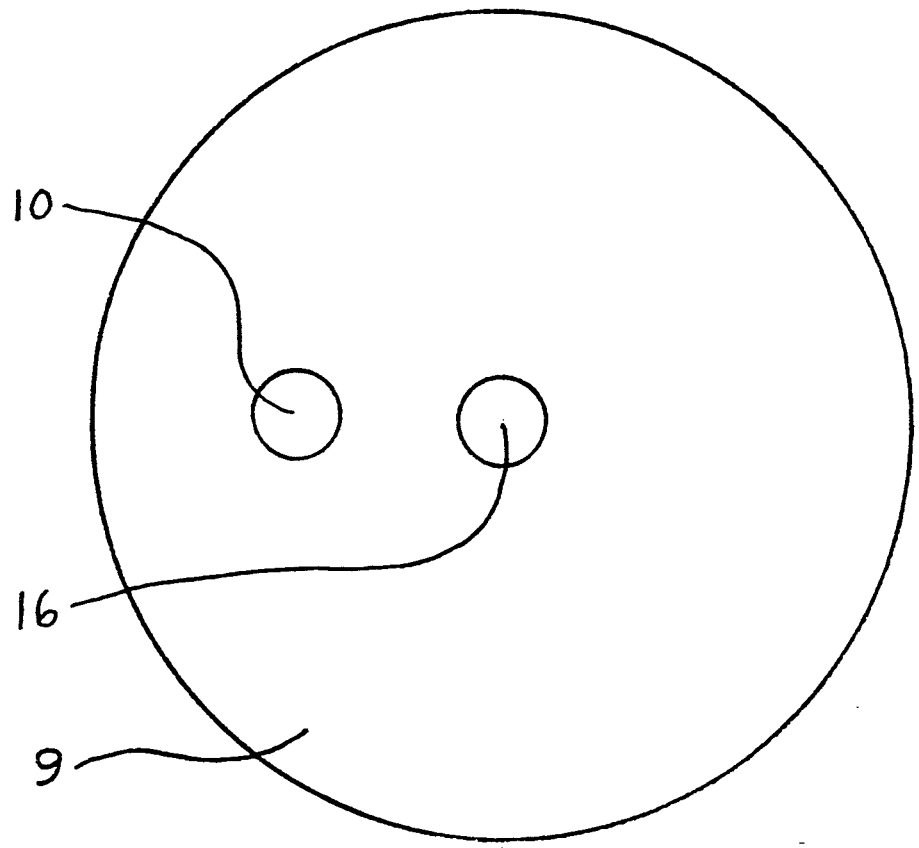
FIG. 3 is a circular plan view of the top cap 7 showing the port 8 and the central bolt hole 16. It is identical to the bottom cap 9 having the port 10.
Figure 4:
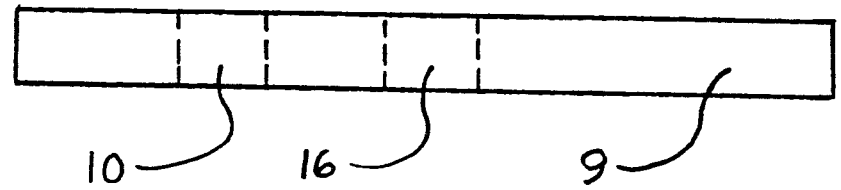
FIG. 4 is a side view projection of the top cap 7 showing the port 8 and the central bolt hole 16.
Figure 6:
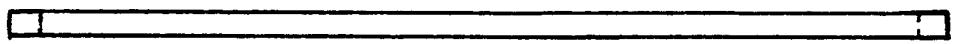
FIG. 6 is a side view projection of the gasket 13.
Figure 5:
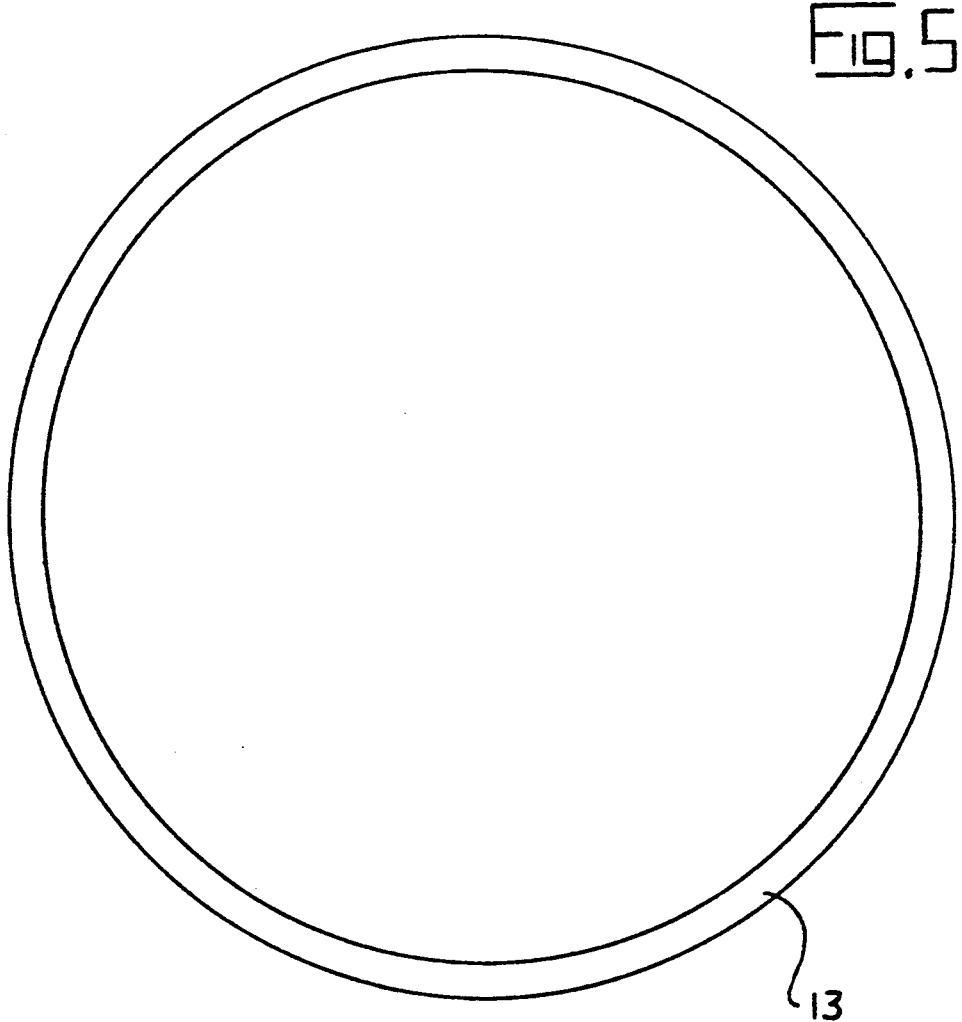
FIG. 5 is a circular plan view of the full gasket 13.

Another embodiment of the invention utilizing the same principle of differential permeability described above, appears in FIG. 2 which utilizes flat discs 11, which may be more readily made than the tubing 4 shown in FIG. 1. In FIG. 2 the oxygen concentrator takes the form of a multi-layer sandwich of permeable discs 11, between end caps 7 and 9 and separated alternately by a full gasket 13 and a spacer gasket 14 which has a vent 24 and O rings 15 and 17 on the central and side holes respectively. It can be observed that this construction provides a continuous chamber of relatively large surface area from the port 8 in the top cap 7 to the port 10 in the bottom cap 9 said port 10 being the discharge port and port 8 the inlet port. Air entering the port 8 passes thru the said continuous chamber 26 in which nitrogen will pass thru the discs 11 to atmosphere thru the vent 24 in the spacer gasket 14. Thus air having a higher proportion of oxygen than is normally present in the atmosphere will be discharged from the concentrator into the interior of a building.

Additional modifications and extensions of this invention will become apparent to those skilled in the art, all such variations and deviations which basically rely on the teachings through which this invention has advanced the art are properly considered to be within the spirit and scope of this invention.

What is claimed is:

1. An apparatus that can take in air from the atmosphere, discard some of the nitrogen content of the air and discharge air that contains a substantially higher proportion of oxygen then is normally found in the atmosphere, comprising; an oxygen concentrator having an inlet port in communication with the atmosphere and a discharge port, an electric motor driven air pump integrally connected to the inlet port of said oxygen concentrator for forcing air thereinto, said oxygen concentrator being a chamber or duct made of a material permeable to nitrogen but not to oxygen, an adjustable orifice valve is provided before the discharge port, whereby oxygen enriched air is discharged from the discharge port.

2. The apparatus in accordance to claim 1, wherein said material is unglazed porcelain.

* * * * *